(12) United States Patent
Mori

(10) Patent No.: US 10,452,506 B2
(45) Date of Patent: Oct. 22, 2019

(54) DRAWING PROCESSING DEVICE, DIAGNOSTIC TEST METHOD AND PROGRAM

(71) Applicant: Renesas Electronics Corporation, Tokyo (JP)

(72) Inventor: Yoshihiko Mori, Tokyo (JP)

(73) Assignee: Renesas Electronics Corporation, Tokyo (JP)

( * ) Notice: Subject to any disclaimer, the term of this patent is extended or adjusted under 35 U.S.C. 154(b) by 148 days.

(21) Appl. No.: 15/658,707

(22) Filed: Jul. 25, 2017

(65) Prior Publication Data

US 2018/0074927 A1   Mar. 15, 2018

(30) Foreign Application Priority Data

Sep. 15, 2016   (JP) ................................ 2016-180538

(51) Int. Cl.
  *G06F 11/273*   (2006.01)
  *G06F 11/22*    (2006.01)
  *G06T 1/20*     (2006.01)

(52) U.S. Cl.
  CPC ........ *G06F 11/273* (2013.01); *G06F 11/2236* (2013.01); *G06T 1/20* (2013.01); *G06T 2200/28* (2013.01)

(58) Field of Classification Search
  CPC ...... G06F 11/2236; G06F 11/273; G06T 1/20; G06T 2200/28
  See application file for complete search history.

(56) References Cited

U.S. PATENT DOCUMENTS

| | | | |
|---|---|---|---|
| 8,799,713 B2* | 8/2014 | Gangasani | G06F 11/27 714/30 |
| 2015/0293173 A1* | 10/2015 | Tsuboi | G01R 31/3177 714/727 |
| 2016/0349322 A1* | 12/2016 | Shibahara | G01R 31/3177 |

FOREIGN PATENT DOCUMENTS

JP   2015-206785 A   11/2015

* cited by examiner

*Primary Examiner* — Joseph R Kudirka
(74) *Attorney, Agent, or Firm* — Mattingly & Malur, PC

(57) ABSTRACT

A drawing processing device includes a GPU, a diagnosis circuit which executes divisions of a diagnostic test of the GPU and a control unit which controls execution of the divided diagnostic tests by the diagnosis circuit. The control unit schedules so as to complete execution of drawing processes for one frame in a first time which is a one-frame display time which is defined in accordance with a frame rate and schedules so as to execute the divided diagnostic tests in a third time which is a remaining time obtained by subtracting a second time which is a processing time requested for execution of the drawing processes for one frame from the first time.

12 Claims, 13 Drawing Sheets

| | |
|---|---|
| DIVIDED DIAGNOSTIC TEST (NO. 1) | $T_{T1}$ ($\mu$ sec) |
| DIVIDED DIAGNOSTIC TEST (NO. 2) | $T_{T2}$ ($\mu$ sec) |
| DIVIDED DIAGNOSTIC TEST (NO. 3) | $T_{T3}$ ($\mu$ sec) |
| DIVIDED DIAGNOSTIC TEST (NO. 4) | $T_{T4}$ ($\mu$ sec) |
| DIVIDED DIAGNOSTIC TEST (NO. 5) | $T_{T5}$ ($\mu$ sec) |
| DIVIDED DIAGNOSTIC TEST (NO. 6) | $T_{T6}$ ($\mu$ sec) |
| ⋮ | |
| DIVIDED DIAGNOSTIC TEST (NO. X) | $T_{TX}$ ($\mu$ sec) |

FIG. 5

FIRST PROCESS TABLE

| DRAWING PROCESS MODE | T$_D$ (μ sec) |
|---|---|
| DIAGNOSTIC TEST MODE | (NO. 1) |
| DIAGNOSTIC TEST MODE | (NO. 2) |

SECOND PROCESS TABLE

| DRAWING PROCESS MODE | T$_D$ (μ sec) |
|---|---|
| DIAGNOSTIC TEST MODE | (NO. 3) |

THIRD PROCESS TABLE

| DRAWING PROCESS MODE | T$_D$ (μ sec) |
|---|---|
| DIAGNOSTIC TEST MODE | (NO. 4) |
| DIAGNOSTIC TEST MODE | (NO. 5) |
| DIAGNOSTIC TEST MODE | (NO. 6) |

⋮

| DRAWING PROCESSING TIME TABLE | |
|---|---|
| EXECUTION TIME OF FIRST DRAWING FRAME | $T_{D1}$ (μ sec) |
| EXECUTION TIME OF SECOND DRAWING FRAME | $T_{D2}$ (μ sec) |
| EXECUTION TIME OF THIRD DRAWING FRAME | $T_{D3}$ (μ sec) |
| EXECUTION TIME OF FOURTH DRAWING FRAME | $T_{D4}$ (μ sec) |

FIG. 10

FIRST PROCESS TABLE

| DIAGNOSTIC TEST MODE | (NO. 1) |
|---|---|
| DRAWING PROCESS MODE | $T_{D1}$ (μ sec) |
| DIAGNOSTIC TEST MODE | (NO. 2) |
| DIAGNOSTIC TEST MODE | (NO. 3) |

SECOND PROCESS TABLE

| DIAGNOSTIC TEST MODE | (NO. 4) |
|---|---|
| DRAWING PROCESS MODE | $T_{D2}$ (μ sec) |
| DIAGNOSTIC TEST MODE | (NO. 5) |

THIRD PROCESS TABLE

| DRAWING PROCESS MODE | $T_{D3}$ (μ sec) |
|---|---|

⋮

DRAWING PROCESSING DEVICE, DIAGNOSTIC TEST METHOD AND PROGRAM

CROSS-REFERENCE TO RELATED APPLICATIONS

The disclosure of Japanese Patent Application No. 2016-180538 filed on Sep. 15, 2016 including the specification, drawings and abstract is incorporated herein by reference in its entirety.

BACKGROUND

The present invention relates to a drawing processing device, a diagnostic test method and a program therefor and relates to the drawing processing device, the diagnostic test method and the program used for performing diagnosis on, for example, a GPU (Graphics Processing Unit).

A configuration which performs fault diagnosis on a processing unit is requested from the viewpoint of functional safety. As such a configuration, for example, Japanese Unexamined Patent Application Publication No. 2015-206785 discloses a semiconductor device which includes a CPU core having a scan chain and a diagnostic test circuit which performs scan testing on the CPU core using the scan chain. In addition, it is also disclosed in Japanese Unexamined Patent Application Publication No. 2015-206785 that a diagnostic test of the CPU core is executed by dividing the diagnostic test into K divided diagnostic tests.

A diagnosis method described in Japanese Unexamined Patent Application Publication No. 2015-206785 is applicable also in a case of performing the fault diagnosis on the GPU. However, in execution of the fault diagnosis of the GPU, it is requested to perform the fault diagnosis in a time of FTTI (Fault Tolerant Time Interval) and in addition it is also requested to maintain graphics drawing performance for realizing a predetermined frame rate.

SUMMARY

The GPU is not allowed to execute a drawing process while the fault diagnosis is being performed on the GPU. In a case where the graphics drawing performance which is requested to the GPU is, for example, 60 FPS (Frames Per Second), it is requested to complete execution of the drawing processes for one frame in about 16.6 msec. (milliseconds) in order to maintain the above-mentioned graphics drawing performance. Therefore, there is such a disadvantage that when the drawing processes and the fault diagnosis are performed at optional timings in a runtime of the GPU (that is, in operation of the GPU), it becomes difficult to maintain the predetermined frame rate.

Other matters to be solved and novel features of the preset invention will become apparent from the description of the present specification and the appended drawings.

The present invention has been made in view of the above mentioned circumstances. According to one embodiment of the present invention, there is provided a drawing processing device including a GPU, a diagnosis circuit which executes a divided diagnostic test of the GPU and a control unit which controls execution of the divided diagnostic tests by the diagnosis circuit. The control unit schedules so as to complete execution of drawing processes for one frame in a first time which is a display time for one frame (hereinafter, referred to as the one-frame display time) which is defined in accordance with a frame rate and also schedules so as to execute the divided diagnostic tests in a third time which is a remaining time obtained by subtracting a second time which is a processing time requested for execution of the drawing processes for one frame from the first time.

According to the above-mentioned one embodiment, it becomes possible to perform the fault diagnosis of the GPU while maintaining the predetermined frame rate.

BRIEF DESCRIPTION OF THE DRAWINGS

FIG. 5 is a schematic diagram illustrating one example of process tables that a process table preparation unit according to the first embodiment prepares.

FIG. 10 is a schematic diagram illustrating one example of process tables that a process table preparation unit according to the second embodiment prepares.

DETAILED DESCRIPTION

For clarification of the explanation, the following description and drawings are appropriately omitted and simplified. In the respective drawings, the same symbols are assigned to the same elements and duplicated description thereof is omitted as requested.

SUMMARY OF EMBODIMENTS

Figure 1:
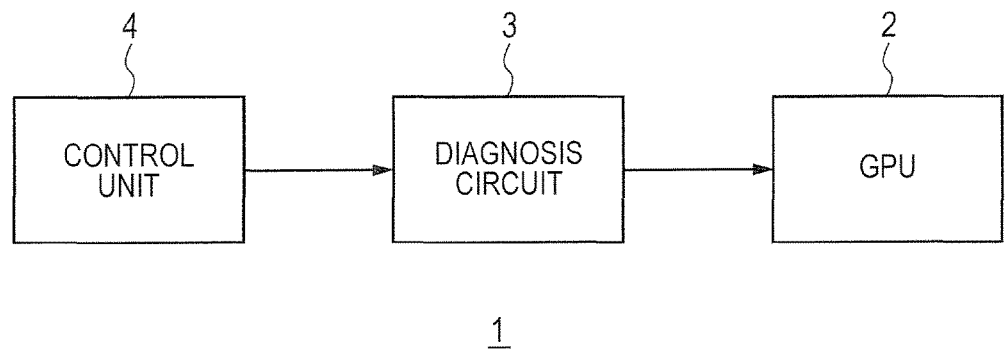
FIG. 1 is a block diagram illustrating one example of a configuration of a drawing processing device according to the summary of embodiments.

The summary of embodiments will be described before describing details of the respective embodiments. FIG. 1 is a block diagram illustrating one example of a configuration of a drawing processing device 1 according to the summary of the embodiments. The drawing processing device 1 includes a GPU 2, a diagnosis circuit 3 and a control unit 4. The GPU 2 performs a drawing process in accordance with instructions from not illustrated application software. The diagnosis circuit 3 is a controller which executes a predetermined diagnostic test for a fault diagnosis of the GPU 2. The diagnosis circuit 3 executes divisions of the predetermined diagnostic test. The control unit 4 controls execution of the divided diagnostic tests by the diagnosis circuit 3. For example, the control unit 4 controls execution of issuance of instructions as to a start timing and an end timing of each of the divided diagnostic tests and so forth by the diagnosis circuit 3.

Here, the control unit 4 schedules so as to complete execution of the drawing processes for one frame in a first time which is the one-frame display time which is defined in accordance with the frame rate and also schedules so as to execute the divided diagnostic tests in a third time which is a remaining time obtained by subtracting a second time which is a processing time requested for execution of the drawing processes for one frame from the first time. Then, the diagnosis circuit 3 executes the divided diagnostic test of the GPU 2 in accordance with the schedule of the control unit 4. Incidentally, the above-mentioned one-frame display time may be also called a frame display switching interval.

According to the drawing processing device 1, the drawing processes for one frame are executed in the first time (about 16.6 msec. in a case where, for example, a requested frame rate is 60 FPS). Accordingly, for example, occurrence of such a situation that the drawing processes of the number which is in excess of the number of the drawing processes for one frame, that is, the drawing processes for the next frame are executed or such a situation that execution of the drawing processes for one frame is not completed in the first time is suppressed. Accordingly, it is possible to maintain the predetermined frame rate even in a case where the GPU 2 not only executes the drawing processes for one frame but also undergoes the fault diagnosis in a runtime. That is, it is possible to perform the fault diagnosis on the GPU 2 while maintaining the predetermined frame rate.

DETAILS OF EMBODIMENTS

First Embodiment

Figure 2:
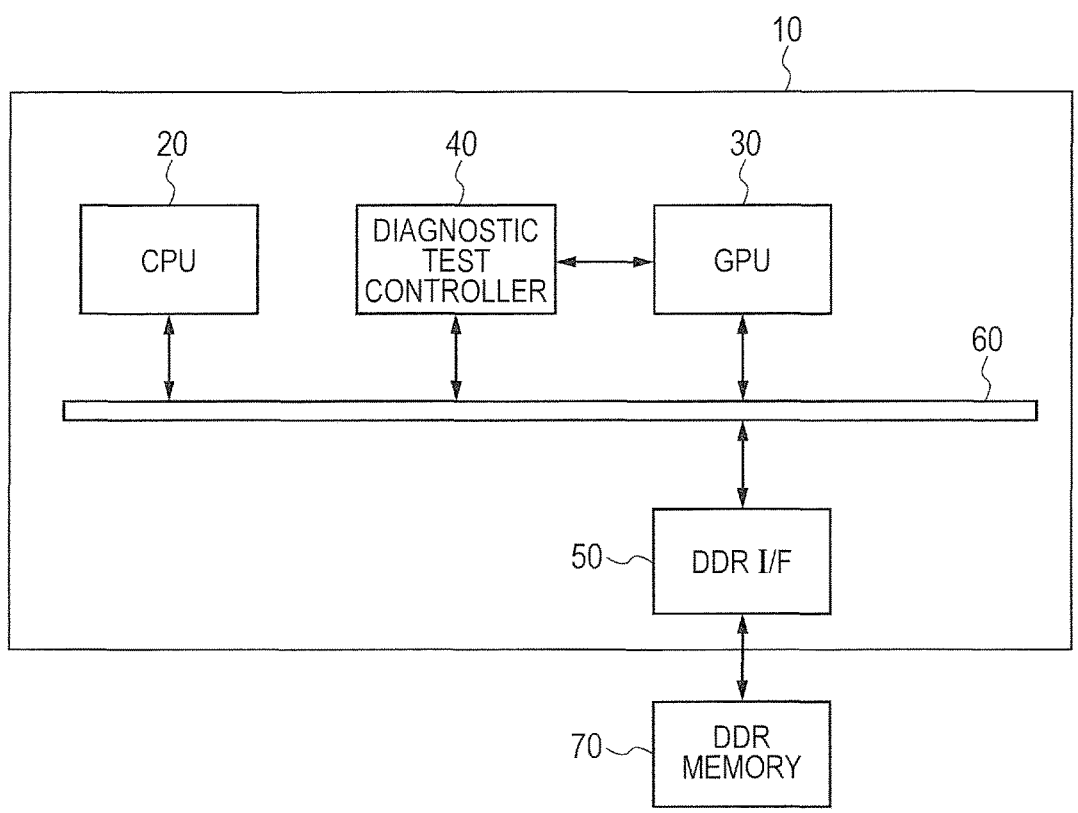
FIG. 2 is a block diagram illustrating one example of a hardware configuration of a drawing processing device according to a first embodiment.

Next, details of the embodiments will be described. FIG. 2 is a block diagram illustrating one example of a hardware configuration of a drawing processing device 10 according to the first embodiment. As illustrated in FIG. 2, the drawing processing device 10 includes a CPU (Central Processing Unit) 20, a GPU 30, a diagnostic test controller 40, a DDR (Double DATA Rate) interface (a DDR I/F) 50, a bus 60 which is coupled with the above-mentioned constitutional elements and so forth.

The CPU 20 implements various processes by executing a program. The GPU 30 performs the drawing processes in accordance with instructions from the application software which is executed by the CPU 20. In addition, the GPU 30 includes a scan testing circuit which configures a scan chain and processes test data sent from the diagnostic test controller 40. The GPU 30 performs switching between a drawing process mode in which the drawing process according to the instructions from the application software is performed and a diagnostic test mode in which the test data is processed in order to perform the diagnostic test under the control of the diagnostic test controller 40.

Figures 3, 4:
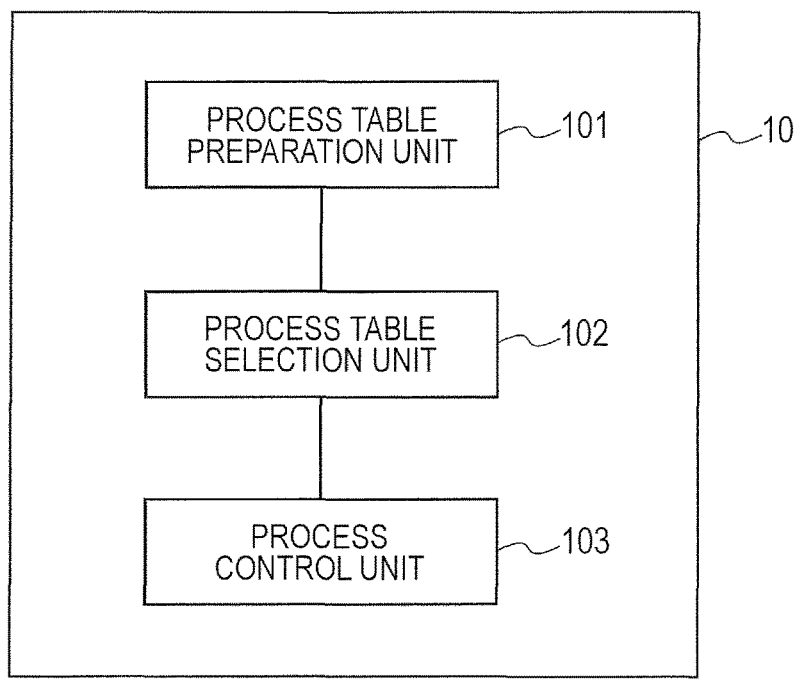
FIG. 3 is a diagram illustrating one example of a table in which a processing time of each divided diagnostic test is stored.
FIG. 4 is a block diagram illustrating one example of functional configurations regarding execution control of the diagnostic test in the drawing processing device according to the first embodiment.

The diagnostic test controller 40 corresponds to the above-mentioned diagnosis circuit 3 and is a diagnosis circuit which performs the fault diagnosis of the GPU 30. The diagnostic test controller 40 executes divisions of the predetermined diagnostic test not at one time but dividedly. The diagnostic test controller 40 decides whether the GPU 30 fails by using the test data. The diagnostic test controller 40 performs the fault diagnosis of the GPU 30 by scan testing. Specifically, the diagnostic test controller 40 controls the scan testing performed on the scan testing circuit of the GPU 30. In the GPU 30, it is possible to perform a BIST (Built-In Self Test) in this way. Incidentally, a processing time requested for performing each of the divided diagnostic tests, that is, an occupancy time of the GPU 30 for each of the divided diagnostic tests is stored in advance in a not illustrated memory included in the drawing processing device 10 or an externally attached DDR memory 70, for example, as a table as illustrated in FIG. 3. The processing time (the occupancy time) is specified by actually measuring the time in advance.

The DDR interface 50 is an interface circuit to which the DDR memory 70 is coupled. The DDR memory 70 is accessed from the GPU 30 and the CPU 20 and image data and so forth generated by execution of the drawing processes are stored into the DDR memory 70.

Next, a configuration corresponding to the above-mentioned control unit 4 will be described. FIG. 4 is a block diagram illustrating one example of functional configurations regarding execution control of the diagnostic test in the drawing processing device 10. For example, the CPU 20 executes the program and thereby each of the functional configurations illustrated in FIG. 4 is implemented.

It is possible to store the above-mentioned program using various types of non-transitory computer readable media and then to supply the program to a computer. The non-transitory computer readable media include various types of tangible storage media. Examples of the non-transitory computer readable media include a magnetic recording medium (for example, a flexible disc, a magnetic tape, a hard disc drive and so forth), a magneto-optical recording medium (for example, a magneto-optical disc and so forth), a CD-ROM (Read Only Memory), a CD-R, a CD-R/W, a semiconductor memory (for example, a mask ROM, a PROM (Programmable ROM), an EPROM (Erasable PROM), a flash ROM, a RAM (Random Access Memory) and so forth. In addition, the program may be supplied to the computer by using various types of transitory computer readable media. Examples of the transitory computer readable media include an electric signal, an optical signal, an electromagnetic wave and so forth. It is possible for the transitory computer readable media to supply the program to the computer via cable communication paths such as an electric wire, an optical fiber and so forth and/or radio communication paths.

As illustrated in FIG. 4, the drawing processing device 10 includes a process table preparation unit 101, a process table selection unit 102, a process control unit 103 and so forth.

The process table preparation unit 101 schedules so as to complete execution of the drawing processes for one frame in the first time which is the one-frame display time which is defined in accordance with the frame rate. In addition, the process table preparation unit 101 also schedules so as to execute the divided diagnostic tests in the third time which is the remaining time obtained by subtracting the second time which is the processing time requested for execution of the drawing processes for one frame from the first time. On that occasion, the process table preparation unit 101 uses a predetermined time as the second time and schedules so as to execute one or more of the divided diagnostic tests in the third time. The process table preparation unit 101 prepares tables (hereinafter, called process tables) every one-frame display time or in units of one-frame display times (that is, at frame display switching intervals) which is defined in accordance with the frame rate for scheduling. The process table defines contents of each process that the GPU 30 performs in the time concerned (for example, the first time) every one-frame display time.

That is, in the first embodiment, the process table preparation unit 101 prepares the table in which a time zone for execution of the drawing processes that a time width is the above-mentioned predetermined time and one or more time zone(s) for execution of the divided diagnostic tests are set every one-frame display time. The predetermined time is a time which is estimated to be sufficient for completing execution of the drawing processes for one frame and is determined in advance. The predetermined time is a time which is estimated from the contents of drawing and so forth by the application software which makes a drawing request, for example, at a design stage. The drawing processing device 10 executes each drawing process in accordance with the table prepared by the process table preparation unit 101.

FIG. 5 is a schematic diagram illustrating one example of the process table that the process table preparation unit 101 according to the first embodiment prepares. As illustrated in FIG. 5, the process table preparation unit 101 prepares the process tables every one-frame display time. That is, every time a swapping process is performed, the drawing processing device 10 executes the process indicated in one process table prepared by the process table preparation unit 101. Incidentally, the swapping process is a process of swapping for which application a region which is provided in the DDR memory 70 so as to be utilized as a memory region for the drawing process or a memory region for display is utilized. The swapping process is a process which is generated every one-frame display time. For example, in a case where the frame rate is 60 FPS, the one-frame display time is about 16.6 msec. Therefore, the drawing processing device 10 uses the process tables one by one every 16.6 msec.

The process table preparation unit 101 schedules so as to ensure a predetermined time $T_D$ which is a time for performing the drawing processes for one frame and to ensure the remaining time as a time zone for execution of the diagnostic test in a time frame of the one-frame display time (for example, about 16.6 msec.). The process table preparation unit 101 prepares the process table by providing one time zone that the GPU 30 is operated in a drawing process mode for the predetermined time $T_D$ and one or more time zone(s) that the GPU 30 is operated in a diagnostic test mode in the time frame of the one-frame display time as illustrated in FIG. 5. Here, the process table preparation unit 101 refers to the processing time of the GPU 30 for each divided diagnostic test which is illustrated in FIG. 3 and adds the time zone that the GPU 30 is operated in the diagnostic test mode to the process table as long as the time does not exceed the one-frame display time (for example, about 16.6 msec.). When referring to FIG. 3, the processing time for the divided diagnostic test (No. 1) is $T_{T1}$ and the processing time for the divided diagnostic test (No. 2) is $T_{T2}$. Accordingly, for example, in the first process table illustrated in FIG. 5, a total processing time of the GPU 30, that is, $T_D+T_{T1}+T_{T2}$ is less than the one-frame display time (for example, about 16.6 msec.).

In a case where the time zone that the GPU 30 is operated in the drawing process mode is to be provided, the process table preparation unit 101 stores an identifier for identifying the drawing process mode and a time that the GPU 30 is operated in the drawing process mode into the table. In addition, in a case where the time zone that the GPU 30 is operated in the diagnostic test mode is to be provided, the process table preparation unit 101 stores an identifier for identifying the diagnostic test mode and an index for specifying one divided diagnostic test to be executed into the table. The process table preparation unit 101 adds the respective divided diagnostic tests in order such that all the divided diagnostic tests are executed. The process table preparation unit 101 schedules so as to complete execution of all the divided diagnostic tests through the plurality of process tables in this way.

Incidentally, it is desirable that the predetermined time $T_D$ be set so as to satisfy the following condition such that execution of all the divided diagnostic tests is completed in the time of FTTI. That is, assuming that a total time of the processing times for the divided diagnostic tests is $T_{total}$, the time of FTTI is $T_{FTTI}$, the one-frame display time which is defined in accordance with the requested frame rate is $T_{frame}$, and the quotient obtained by dividing $T_{FTTI}$ by $T_{frame}$ is N, $T_D$ is set so as to satisfy $T_D \times N + T_{total} < T_{FTTI}$.

The process table selection unit 102 selects the process tables prepared by the process table preparation unit 101 one by one in order. The process table selection unit 102 outputs the selected process table to the process control unit 103.

The process control unit 103 determines the mode of the GPU 30 in accordance with the process table selected by the process table selection unit 102. The process control unit 103 controls the diagnostic test controller 40 such that the GPU 30 is operated in accordance with the determined mode. For example, in a case where the first process table illustrated in FIG. 5 has been selected by the process table selection unit 102, the process control unit 103, first, notifies the diagnostic test controller 40 so as to operate the GPU 30 in the drawing process mode. Thereby, it becomes possible for the GPU 30 to execute the drawing process concerned. In this case, the diagnostic test controller 40 does not execute the divided diagnostic test concerned. After the predetermined time $T_D$ has elapsed, the process control unit 103 notifies the diagnostic test controller 40 so as to operate the GPU 30 in the diagnostic test mode. On that occasion, the process control unit 103 notifies the diagnostic test controller 40 so as to execute the divided diagnostic test (No. 1) on the GPU 30 in accordance with the process table concerned. Then, when the diagnostic test (NO. 1) is executed, the process control unit 103 notifies the diagnostic test controller 40 so as to execute the divided diagnostic test (No. 2) on the GPU 30 in accordance with the process table.

Selection of the process table by the process table selection unit 102 is performed every one-frame display time which is defined in accordance with the requested frame rate. Accordingly, the process control unit 103 controls the diagnostic test controller 40 in accordance with one process table every one-frame display time.

The drawing processing device 10 according to the first embodiment schedules so as to complete execution of the drawing processes for one frame in the one-frame display time and also schedules so as to execute one or more of the divided diagnostic tests. Accordingly, it becomes possible to perform the fault diagnosis on the GPU 30, for example, while maintaining the predetermined frame rate.

Second Embodiment

Next, the second embodiment will be described. In the first embodiment, scheduling is performed by using the predetermined time as the processing time requested for execution of the drawing processes for one frame. However, in this case, such things as follows are thought of. When the diagnostic test is executed in a case where an actual processing time requested for execution of the drawing processes for one frame exceeds the predetermined time which has been estimated in advance, it is feared that execution of the drawing processes for one frame may not been completed in the frame display switching interval (for example, in about 16.6 msec.). In this case, it becomes difficult to maintain the predetermined frame rate. Therefore, in the second embodiment, a drawing processing device 15 performs scheduling after the actual processing time requested for execution of the drawing processes for one frame has been estimated.

Figure 6:
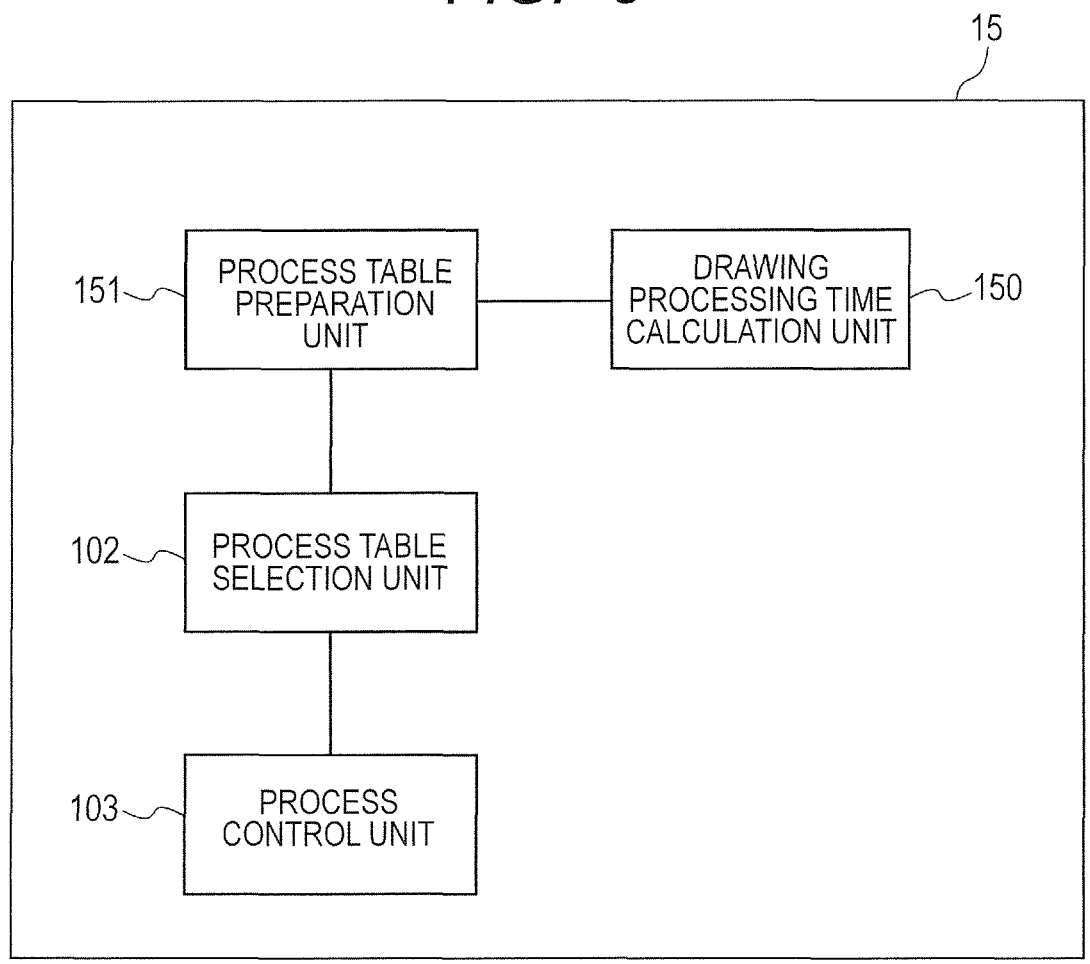
FIG. 6 is a block diagram illustrating one example of functional configurations regarding the execution control of the diagnostic test in a drawing processing device according to a second embodiment.

In the following, the drawing processing device 15 according to the second embodiment will be specifically described. A hardware configuration of the drawing processing device 15 according to the second embodiment is the same as the hardware configuration of the drawing processing device 10 according to the first embodiment. The drawing processing device 15 according to the second embodiment is different from the drawing processing device 10 according to the first embodiment in functional configurations regarding the execution control of the diagnostic test. FIG. 6 is a block diagram illustrating one example of the functional configurations regarding the execution control of the diagnostic test in the drawing processing device 15. For example, the CPU 20 executes the program and thereby each of the functional configurations illustrated in FIG. 6 is implemented. As illustrated in FIG. 6, the drawing processing device 15 includes a drawing processing time calculation unit 150, a process table preparation unit 151, the process table selection unit 102, the process control unit 103 and so forth. The drawing processing device 15 according to the second embodiment is different from the drawing processing device 10 according to the first embodiment in the point that the drawing processing time calculation unit 150 is added and the process table preparation unit 101 is replaced with the process table preparation unit 151 in this way.

Figure 7:
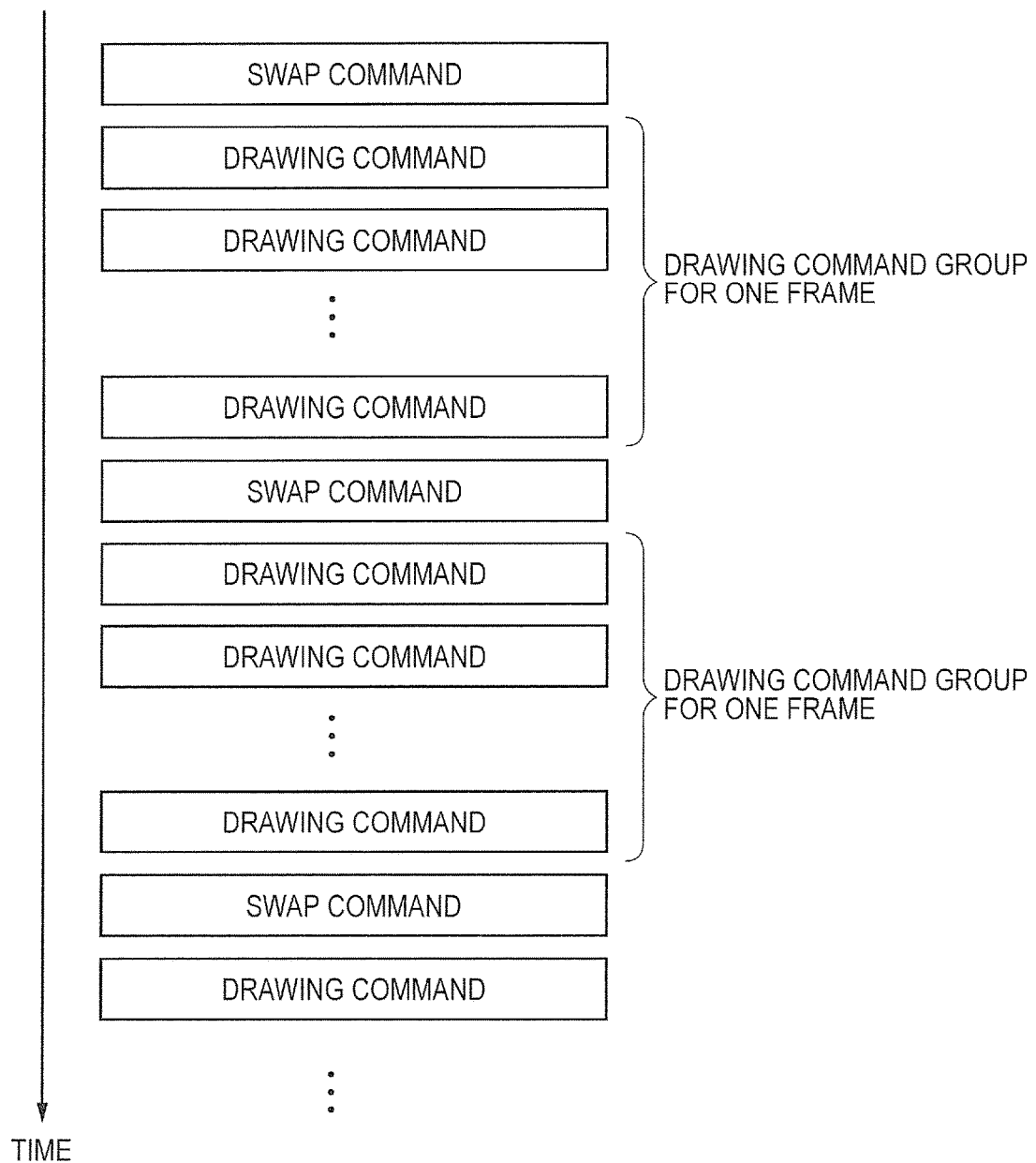
FIG. 7 is a diagram illustrating one example of command groups output from application software.

The drawing processing time calculation unit 150 calculates the processing time requested for execution of the drawing processes for one frame. Here, the drawing processing time calculation unit 150 estimates the processing requested for execution of the drawing processes for one frame from a drawing command issued to the GPU 30. Specifically, the drawing processing time calculation unit 150 estimates the processing time from a command volume of a drawing command group which is output from the application software which makes a drawing request and corresponds to the drawing processes for one frame. Incidentally, swapping commands for requesting execution of the swapping process are inserted before and behind the drawing command group which is output from the application software and corresponds to the drawing processes for one frame as illustrated in FIG. 7. Therefore, the drawing processing time calculation unit 150 specifies that the drawing command group which is sandwiched between the swapping commands as the drawing command group which corresponds to the drawing processes for one frame.

Figures 8, 9:
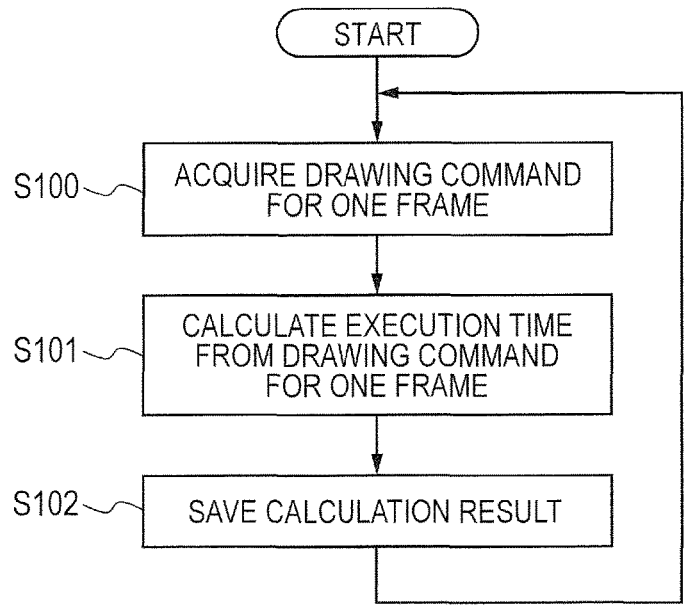
FIG. 8 is a flowchart illustrating one example of an operation of a drawing processing time calculation unit.
FIG. 9 is a diagram illustrating one example of a drawing processing time table.

FIG. 8 is a flowchart illustrating one example of an operation of the drawing processing time calculation unit 150. The drawing processing time calculation unit 150 repeats execution of the following process.

In step 100 (S100), the drawing processing time calculation unit 150 acquires the drawing commands for one frame.

Next, in step 101 (S101), the drawing processing time calculation unit 150 calculates an execution time taken when a GPU 30 executes the drawing processes in accordance with the drawing commands for one frame acquired in step 100.

Next, in step 102 (S102), the drawing processing time calculation unit 150 stores the time calculated in step 101 into the DDR memory 70. Then, the process returns to step 100 for calculation of the execution time taken for execution of the drawing processes for the next one frame. Incidentally, in step 102, the drawing processing time calculation unit 150 stores the times calculated in step 101 frame by frame. In the second embodiment, the drawing processing time calculation unit 150 prepares such a drawing processing time table as illustrated in FIG. 9 and manages the times calculated in step 101 in accordance with this table.

Next, the process table preparation unit 151 will be described. The process table preparation unit 151 schedules so as to complete execution of the drawing processes for one frame in the first time which is the one-frame display time which is defined in accordance with the frame rate and also schedules so as to execute the divided diagnostic tests in the third time which is the remaining time obtained by subtracting the second time which is the processing time requested for execution of the drawing processes for one frame from the first time similarly to the process table preparation unit 101 according to the first embodiment. However, the process table preparation unit 151 uses an estimated time which is estimated from the drawing command to the GPU 30 as the second time and schedules so as to postpone execution of the divided diagnostic tests in a case where the third time is less than a time requested for execution of the divided diagnostic tests. The process table preparation unit 151 prepares the process tables every one-frame display time which is defined in accordance with the frame rate for scheduling. That is, the process table preparation unit 151 according to the second embodiment prepares the process tables by using the time calculated by the drawing processing time calculation unit 150 as the processing time requested for execution of the drawing processes for one frame, instead of the predetermined time. Then, in a case where the processing time requested for execution of the drawing processes for one frame is too long and therefore it is difficult to complete execution of the drawing processes for one frame by the GPU 30 and to complete execution of the divided diagnostic tests on the GPU 30 in the frame display switching interval, the drawing processing time calculation unit 150 schedules so as to execute the divided diagnostic tests in the next or later display switching interval. Accordingly, it is possible to suppress occurrence of such a situation that execution of the drawing processes for one frame is not completed in the frame display switching interval. That is, it is possible to maintain the predetermined frame rate.

Incidentally, when postponement of execution of the divided diagnostic tests frequently occurs, it is feared that execution of all the divided diagnostic tests may not be completed in the time of FTTI. Thus, in the second embodiment, in a case where when it is scheduled so as to complete execution of the drawing processes for one frame in the one-frame display time (that is, the frame display switching interval) which is defined in accordance with the frame rate, it becomes difficult to execute all the divided diagnostic tests in the time of FTTI, the process table preparation unit 151 schedules so as to prefer execution of the divided diagnostic tests and to postpone execution of the drawing processes. In this case, although it becomes difficult to maintain the predetermined frame rate, it becomes possible to complete execution of all the divided diagnostic tests in the time of FTTI and therefore it becomes possible to meet a predetermined standard requested for functional safety.

FIG. 10 is a schematic diagram illustrating one example of the process tables that the process table preparation unit 151 according to the second embodiment prepares. As illustrated in FIG. 10, the process table preparation unit 151 prepares the process tables every one-frame display time similarly to the process table preparation unit 101 according to the first embodiment. In the second embodiment, only the time zone that the GPU 30 is operated in the drawing process mode may be set in one process table as indicated by the third process table in FIG. 10. Incidentally, since in the example illustrated in FIG. 10, a processing time $T_{D3}$ is too long, it is difficult to set execution of the divided diagnostic test (No. 6) to the third process table. That is, the sum of the processing time $T_{D3}$ and a processing time $T_{T6}$ (see FIG. 3) for the divided diagnostic test (No. 6) exceeds the time frame of the one-frame display time (for example, about 16.6 msec.) and therefore an execution timing for the divided diagnostic test (No. 6) is postponed. As a result, the execution timing for the divided diagnostic test (No. 6) will be defined in any one of the forth and later process tables. Incidentally, occurrence of such postponement of execution of the divided diagnostic test concerned is allowed as long as it is possible to execute all the divided diagnostic tests in the time of FTTI. However, in a case where it becomes difficult to execute all the divided diagnostic tests in the time of FTTI due to preferential execution of the drawing processes as described above, the process table preparation unit 151 schedules so as to prefer execution of the divided diagnostic tests and to postpone execution of the drawing processes.

Also in the second embodiment, in a case where the time zone that the GPU 30 is operated in the drawing process mode is to be provided, the process table preparation unit 151 stores the identifier for identifying the drawing process mode and the time that the GPU 30 is operated in the drawing process mode into the table concerned. In addition, in a case where the time zone that the GPU 30 is operated in the diagnostic test mode is to be provided, the process table preparation unit 151 stores the identifier for identifying the diagnostic test mode and the index for specifying one divided diagnostic test to be executed this time in the divided diagnostic tests into the table concerned. The process table preparation unit 151 adds the respective divided diagnostic tests to the tables in order such that all the divided diagnostic tables are executed. The process table preparation unit 151 schedules so as to execute all the divided diagnostic tests through the plurality of process tables in this way.

Figure 11A:
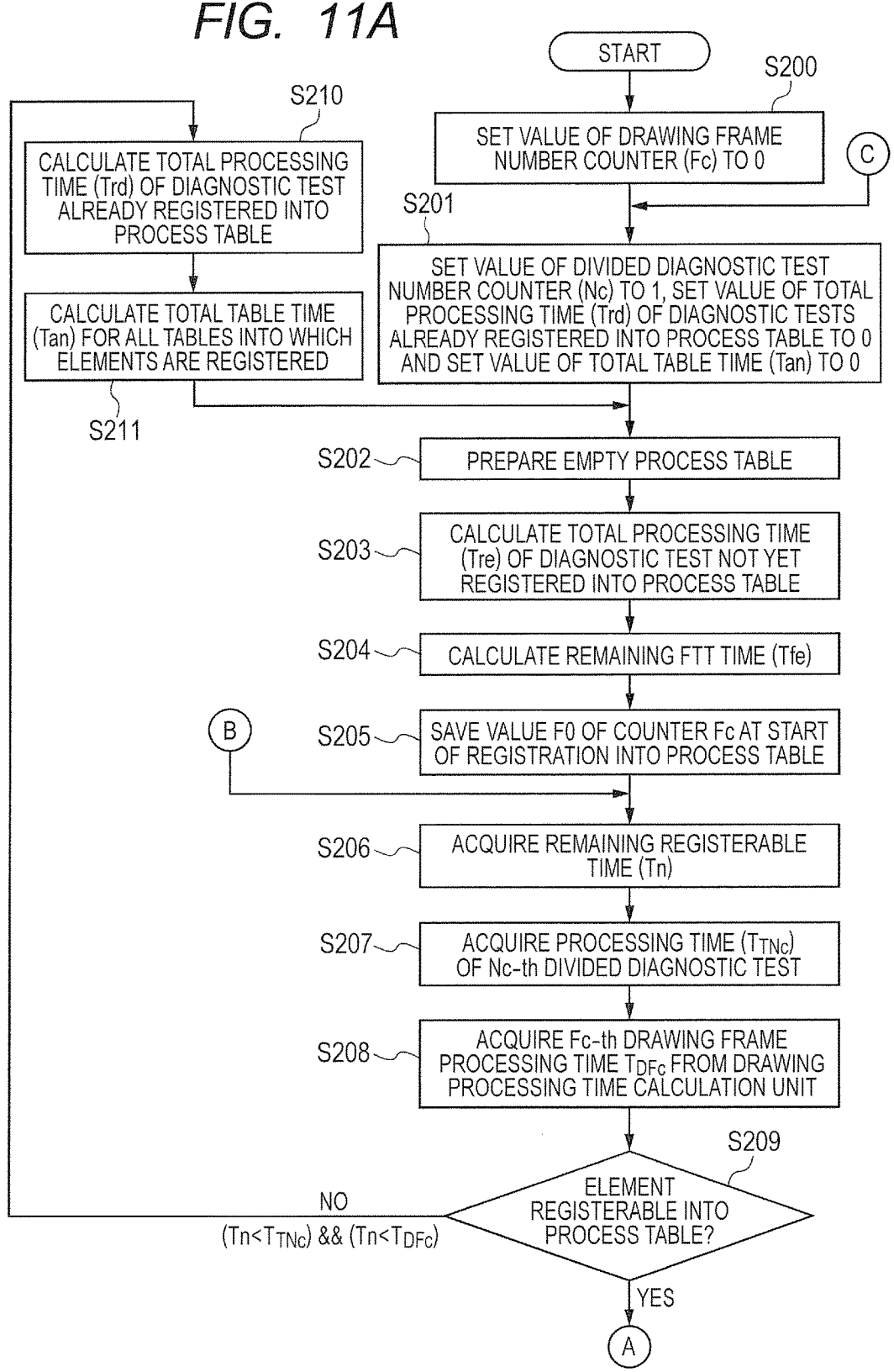
FIG. 11A is a flowchart illustrating one example of an operation of the process table preparation unit according to the second embodiment.
Figure 11B:
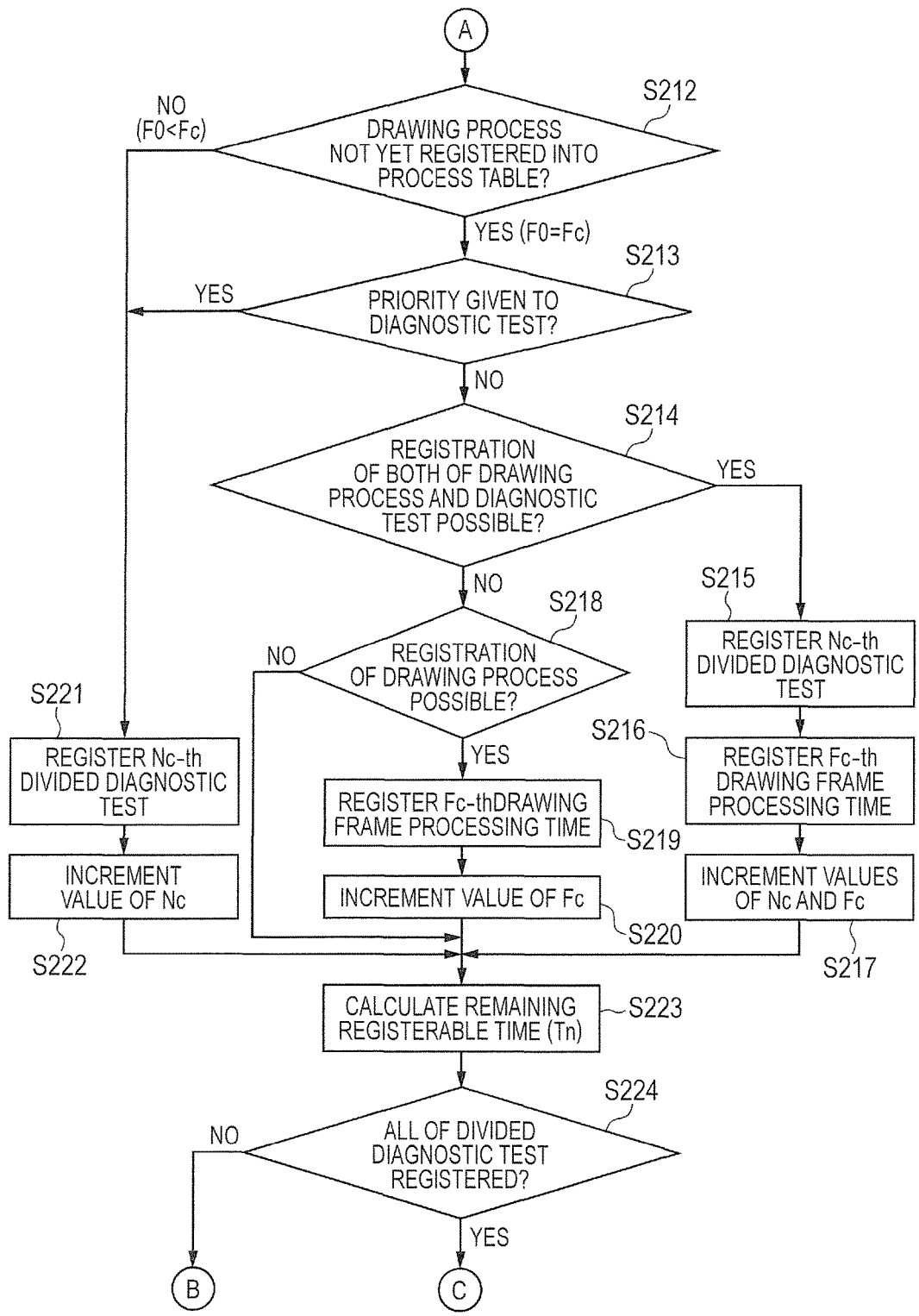
FIG. 11B is a flowchart illustrating one example of the operation of the process table preparation unit according to the second embodiment.

FIG. 11A and FIG. 11B are flowcharts each illustrating one example of an operation of the process table preparation unit 151. In the following, one example of the operation of the process table preparation unit 151 will be described along the flows in FIG. 11A and FIG. 11B.

In step 200 (S200), the process table preparation unit 151 sets a value of Fc which is a counter of a number of each drawing frame to 0.

Next, in step 201 (S201), the process table preparation unit sets a value of Nc which is a counter of a number of each divided diagnostic test to 1, sets a value of Trd which is a variable indicating a total processing time for the divided diagnostic tests which have already been registered in the process tables to 0, and sets a value of Tan which is a variable indicating a total table time to 0. Incidentally, the total table time is a time which is indicated by the product of the number of the process tables in which elements are registered and the one-frame display time (that is, the length of the time in the time frame of the process table concerned and, for example, about 16.6 msec.)

Next, in step 202 (S202), the process table preparation unit 151 prepares an empty process table in which no element is registered.

Next, in step 203 (S203), the process table preparation unit 151 calculates a total processing time Tre of the divided diagnostic tests which are not yet registered into the process tables. The process table preparation unit 151 calculates the total processing time Tre by subtracting the total processing time Trd for the divided diagnostic tests which have already been registered in the process tables from the total of the processing times for all the divided diagnostic tests.

Next, in step 204 (S204), the process table preparation unit 151 calculates a remaining time Tfe which is the remaining FTTI time. The process table preparation unit 151 calculates the remaining time Tfe by subtracting the total table time Tan from the FTTI time. Incidentally, the FTTI time is stored in advance in the DDR memory 70 or a not illustrated memory.

Next, in step 205 (S205), the process table preparation unit 151 saves a counter value FO which is a value of a counter Fc at start of registration of the element into the process table concerned into the DDR memory 70 or the not illustrated memory.

Next, in step 206 (S206), the process table preparation unit 151 acquires a remaining registerable time Tn for the process table which is currently set as an object for registration. Incidentally, in a case where the registerable time Tn is acquired for the first time for the process table which is currently set as the object for registration, the registerable time Tn acquired in step 206 is the one-frame display time (that is, the length of the time in the time frame of the process table and, for example, about 16.6 msec.). On the other hand, the registerable time Tn which is acquired after the second time is a time which will be calculated in later described step 223.

Next, in step 207 (S207), the process table preparation unit 151 refers to a table which is stored in advance and is of the form as illustrated in FIG. 3 and acquires a processing time $T_{TNc}$ for the Nc-th divided diagnostic test.

Next, in step 208 (S208), the process table preparation unit 151 acquires a processing time $T_{DFc}$ for the Fc-th drawing frame from the drawing processing time calculation unit 150.

Next, in step 209 (S209), the process table preparation unit 151 decides whether the element is registerable into the process table which is currently set as the object for registration. Specifically, in a case where Tn acquired in step 206 is smaller than $T_{TNc}$ acquired in step 207 and is also smaller than $T_{DFc}$ acquired in step 208, the process table preparation unit 151 decides that further element registration is difficult. In the other case, the process table preparation unit 151 decides that element registration is possible. In a case where it has been decided that further element registration is difficult, the process proceeds to step 210. On the other hand, in a case where it has been decided that element registration is possible, the process proceeds to step 212.

In step 210 (S201), the process table preparation unit 151 calculates the total processing time Trd for the divided diagnostic tests which have already been registered in the process tables.

Next, in step 211 (S211), the process table preparation unit 151 calculates the total table time Tan. After execution of the process in step 211, the process returns to step 202.

In step 212 (S212), the process table preparation unit 151 decides whether the drawing process (that is, the drawing process mode) is not yet registered into the process table which is currently set as the object for registration. In the second embodiment, in a case where FO=Fc, the process table preparation unit 151 decides that no drawing process is registered into the process table. In addition, in a case where FO<Fc, the process table preparation unit 151 decides that the drawing process has already been registered in the process table. In a case where it has been decided that no drawing process is registered in the process table, the process proceeds to step 213. On the other hand, in a case where it has been decided that the drawing process has already been registered into the process table, the process proceeds to step 221.

In the step 213 (S213), the process table preparation unit 151 decides whether registration of the divided diagnostic tests is to be preferred. In a case where it is difficult to execute all the divided diagnostic tests in the time of FTTI when scheduling so as to complete execution of the drawing processes for one frame in the one-frame display time which is defined in accordance with the frame rate, the process table preparation unit 151 prefers execution of the divided diagnostic tests as described above. In a case where the total processing time Tre of the not-yet-registered divided diagnostic tests exceeds the remaining time Tfe when the drawing processes for one frame are registered into the process table, the process table preparation unit 151 skips registration of the drawing processes. That is, in this case, the process table preparation unit 151 decides to prefer registration of the divided diagnostic tests. In a case where it has not been decided to prefer registration of the divided diagnostic tests, the process proceeds to step 214. On the other hand, in a case where it has been decided to prefer registration of the divided diagnostic tests, the process proceeds to step 221.

In step 214 (S214), the process table preparation unit 151 decides whether it is possible to register both of the drawing process and the divided diagnostic test into the process table concerned. Specifically, in a case where Tn acquired in step 206 is larger than the sum of Tmc acquired in step 207 and $T_{DFc}$ acquired in step 208, the process table preparation unit 151 decides that it is possible to register both of the drawing process and the divided diagnostic test into the process table. In a case where it has been decided that it is possible to register both of the drawing process and the divided diagnostic test into the process table, the process proceeds to step 215. On the other hand, in a case where it has been decided that it is difficult to register both of the drawing process and the divided diagnostic test into the process table, the process proceeds to step 218.

In step 215 (S215), the process table preparation unit 151 registers the Nc-th divided diagnostic test into the process table which is currently set as the object for registration. That is, as illustrated in FIG. 10, the process table preparation unit 151 sets the diagnostic test mode to the process table and registers the number Nc of the Nc-th divided diagnostic test into the process table.

Next, in step 216 (S216), the process table preparation unit 151 registers the processing time for the Fc-th drawing frame into the process table which is currently set as the object for registration. That is, as illustrated in FIG. 10, the process table preparation unit 151 sets the drawing process mode to the process table and registers the execution time $T_{DFc}$ for the Fc-th drawing frame into the process table.

Next, in step 217 (S217), the process table preparation unit 151 increments the values of Nc and Fc respectively. Then, the process proceeds to step 223.

In step 218 (S218), the process table preparation unit 151 decides whether it is possible to register the drawing process into the process table concerned. Specifically, in a case where Tn acquired in step 206 is larger than $T_{DFc}$ acquired in step 208, the process table preparation unit 151 decides that it is possible to register the drawing process into the process table. In a case where it has been decided that it is possible to register the drawing process into the process table, the process proceeds to step 219. On the other hand, in a case where it has been decided that it is difficult to register the drawing process into the process table, the process proceeds to step 223. That it is difficult to register the drawing process into the process table means that it is difficult to execute the drawing process in the frame display switching interval. In this case, frame display is executed by reducing the frame rate.

In step 219 (S219, the process table preparation unit 151 registers the processing time for the Fc-th drawing frame into the process table which is currently set as the object for registration similarly to the process in step 216.

Then, in step 220 (S220), the process table preparation unit 151 increments the value of Fc. Then, the process proceeds to step 223.

In step 221 (S221), the process table preparation unit 151 registers the Nc-th divided diagnostic test into the process table which is currently set as the object for registration similarly to the process in step 215.

Then, in step 222 (S222), the process table preparation unit 151 increments the value of Nc. Then, the process proceeds to step 223.

In step 223 (S223), the process table preparation unit 151 calculates the remaining registerable time Tn for the process table which is currently set as the object for registration. Incidentally, the registerable time Tn is calculated by subtracting the total processing time of the drawing process and the divided diagnostic test registered into the process table from the one-frame display time (that is, the length of time in the time frame in the process table and, for example, about 16.6 msec.). Incidentally, in step 218, in a case where it has been decided that it is difficult to register the drawing process into the process table, the process table preparation unit 151 adds the one-frame display time which is defined in accordance with the original frame rate to Tn calculated in step 223. For example, in a case where the original frame rate is 60 FPS, Tn=Tn+16.6 is established and the frame rate is changed to 30 FPS.

Next, in step 224 (S224), the process table preparation unit 151 decides whether all the divided diagnostic tests have been registered. Specifically, the process table preparation unit 151 makes a decision depending on whether the value of Nc reaches the number of divisions of the diagnostic test. In a case where all the divided diagnostic tests are not registered, the process returns to step 206. On the other hand, in a case where all the divided diagnostic tests have been registered, the process returns to step 201.

Next, details of the process table selection unit 102 and the process control unit 103 will be described. Incidentally, in the second embodiment, the process of the process table preparation unit 151 is executed in parallel with the processes of the process table selection unit 102 and the process control unit 103. Incidentally, there is a time difference between output of the drawing command from the application software and actual execution of the drawing command by the GPU 30. Therefore, the process tables are prepared by utilizing this time difference.

The process table selection unit 102 selects the process tables prepared by the process table preparation unit 101 one by one in order. The process table selection unit 102 outputs the selected process table to the process control unit 103.

Figure 12:
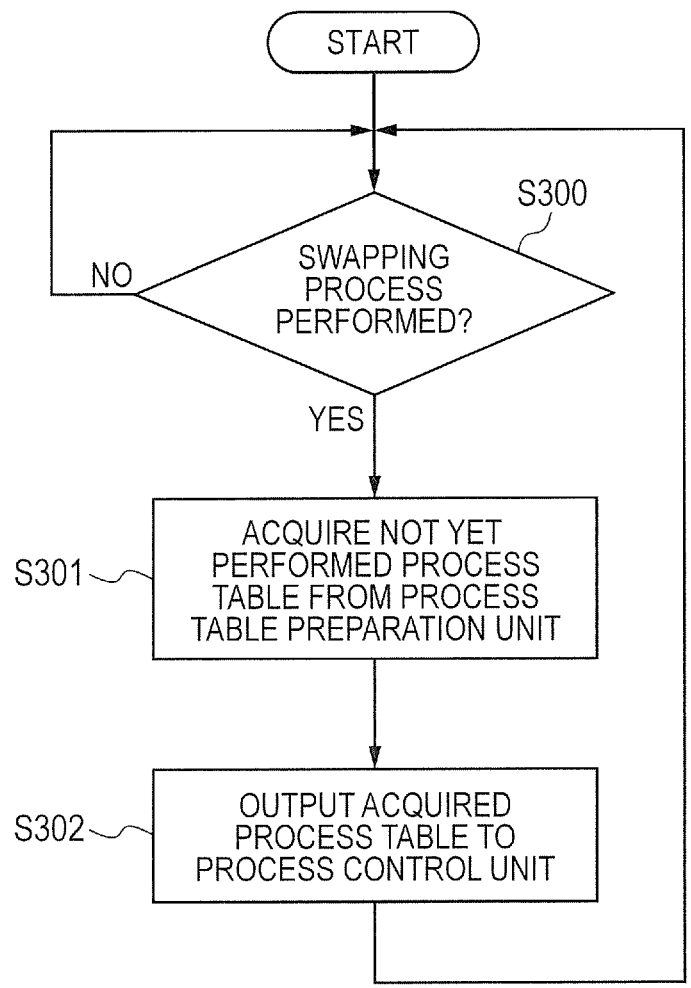
FIG. 12 is a flowchart illustrating one example of an operation of a process table selection unit.

FIG. 12 is a flowchart illustrating one example of an operation of the process table selection unit 102. The process table selection unit 102 repeats execution of the following process.

In step 300 (S300), the process table selection unit 102 decides whether the swapping process has been performed. When it is confirmed that the swapping process has been performed, the process proceeds to step 301.

In step 301 (S301), the process table selection unit 102 selects and acquires one process table in accordance with which any process is not yet performed from within the process tables prepared by the process table preparation unit 10.

Next, in step 302 (S302), the process table selection unit 102 outputs the acquired process table to the process control unit 103.

Figure 13:
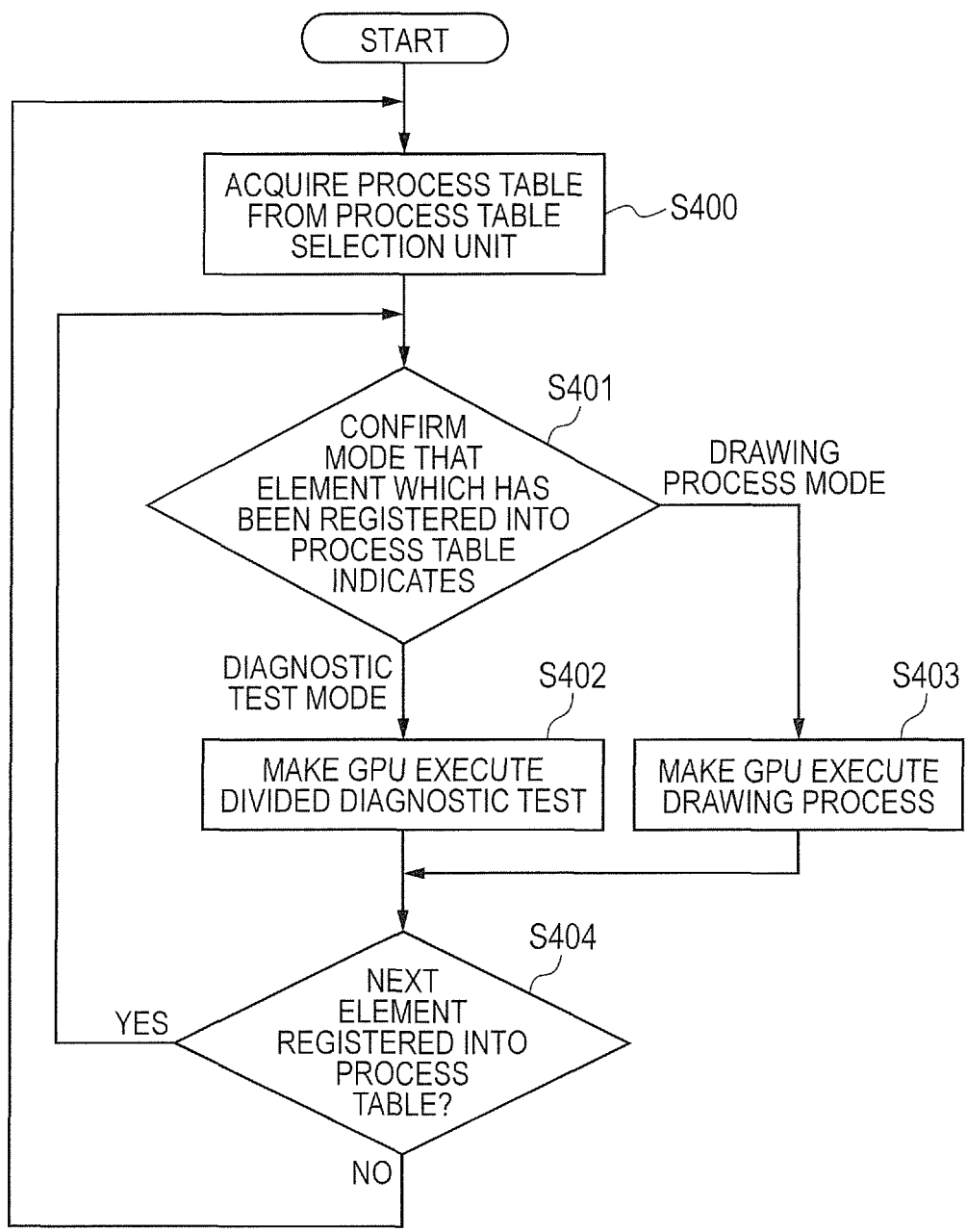
FIG. 13 is a flowchart illustrating one example of an operation of a process control unit.

Next, an operation of the process control unit 103 will be described. FIG. 13 is a flowchart illustrating one example of the operation of the process control unit 103. The process control unit 103 repeats execution of the following process.

In step 400 (S400), the process control unit 103 acquires the process table concerned from the process table selection unit 102.

Next, in step 401 (S401), the process control unit 103 confirms the mode that the element which is registered in the process table acquired in step 400 indicates. In a case where the mode that the element indicates is the diagnostic test mode, the process proceeds to step 402. In a case where the mode that the element indicates is the drawing process mode, the process proceeds to step 403.

In step 402 (S402), the process control unit 103 makes the GPU 30 undergo the divided diagnostic test. Then, the process proceeds to step 404.

On the other hand, in step 403 (S403), the process control unit 103 makes the GPU 30 execute the drawing process. Then, the process proceeds to step 404.

In step 404 (S404), the process control unit 103 decides whether the next element which does not yet become the object to be executed by the GPU 30 is registered in the process table acquired in step 400. In a case where the next element is registered in the process table acquired in step 400, the process returns to step 401. In a case where the next element is not registered in the process table acquired in step 400, the process returns to step 400.

The process following the schedule indicated in one process table is executed by the GPU 30 every time the swapping process is executed in this way.

Figure 14:
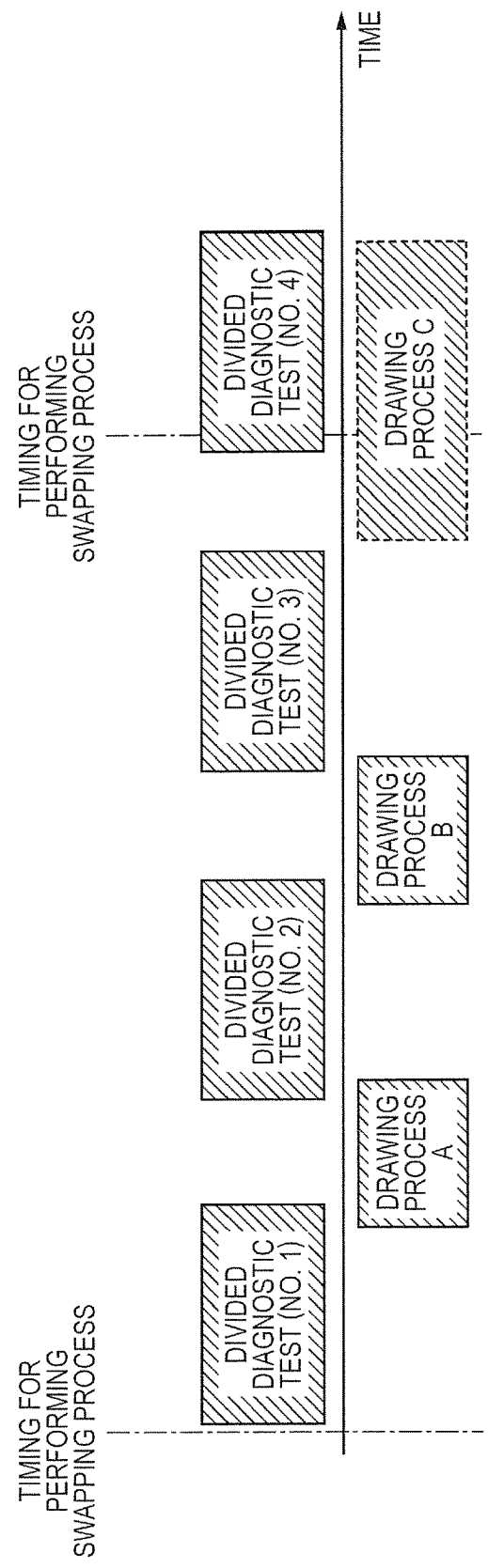
FIG. 14 is a diagram illustrating one example of execution timings of a drawing process and a diagnostic test in a comparative example.
Figure 15:
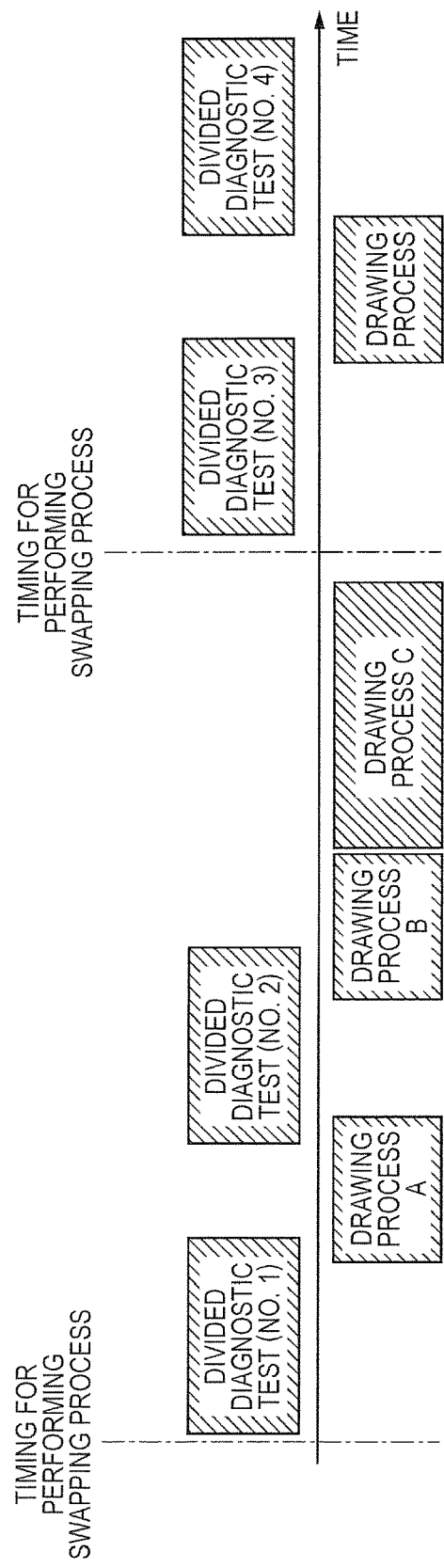
FIG. 15 is a diagram illustrating one example of the execution timings of the drawing process and the diagnostic test in the second embodiment.

Here, advantageous effects of the second embodiment relative to a comparative example will be described. It is assumed that the divided diagnostic tests are executed at a time interval which has been set in advance in the comparative example. In this case, as illustrated in FIG. 14, there are cases where execution of all the drawing processes for one frame is not completed in the frame display switching interval. Incidentally, in FIG. 14, it is assumed that drawing processes A to C are the drawing processes for one frame. On the other hand, in the second embodiment, since the above mentioned scheduling is performed, execution of the drawing process C is preferred to execution of the divided diagnostic test (No. 3) as illustrated in FIG. 15. Therefore, the predetermined frame rate is maintained. In addition, since it is scheduled so as to execute the divided diagnostic tests by utilizing a spare time which is a time that the drawing processes for one frame are not performed, it is possible to execute many divided diagnostic tests in a case where a time requested for execution of the drawing processes for one frame is short. Therefore, it is possible to suppress a time requested until execution of all the divided diagnostic tests is completed and it is possible to complete execution of the diagnostic test in the FTTI time. Incidentally, although it is illustrated in FIG. 15 that the drawing processes A to C which are the drawing processes for one frame are executed dispersedly, the drawing processes A to C may be executed successively. For example, the drawing processes A to C may be executed after execution of the divided diagnostic test (No. 1) and then the divided diagnostic test (No. 2) may be executed.

In the foregoing, the second embodiment has been described. In a case where the time obtained by subtracting the processing time requested for execution of the drawing processes for one frame from the one-frame display time which is defined in accordance with the frame rate is less than the time requested for execution of the divided diagnostic tests, the drawing processing device 15 according to the second embodiment schedules so as to postpone execution of the divided diagnostic tests. Accordingly, it becomes possible to more suppress occurrence of a situation that execution of the drawing processes for one frame is not completed in the frame display switching interval. In addition, in a case where when scheduling so as to complete execution of the drawing processes for one frame in the one-frame display time which is defined in accordance with the frame rate, it is difficult to execute all the divided diagnostic tests in the FTTI time, the drawing processing device 15 according to the second embodiment schedules so as to prefer execution of the divided diagnostic tests and to postpone execution of the drawing processes for one frame. Therefore, it is possible to complete execution of the divided diagnostic tests in the FTTI time and it is possible to realize the functional safety irrespective of frequent occurrence of postponement of the execution of the divided diagnostic tests.

Although the invention which has been made by the inventors and others has been specifically described on the basis of the embodiments thereof as mentioned above, it goes without saying that the present invention is not limited to the above-mentioned embodiments and may be altered and modified in a variety of ways within a range not deviating from the gist of the present invention.

What is claimed is:

1. A drawing processing device comprising:
a Graphics Processing Unit (GPU);
a diagnosis circuit which divides, into time segments, an execution of a diagnostic test of the GPU as divided diagnostic tests; and
a controller which controls execution of the divided diagnostic tests by the diagnosis circuit,
wherein the controller schedules so as to:
complete execution of drawing processes for one frame in a first time which is a one-frame display time which is defined in accordance with a frame rate, and
execute one or more of the divided diagnostic tests in a third time which is a remaining time obtained by subtracting a second time, which is a processing time requested for execution of the drawing processes for the one frame, from the first time.

2. The drawing processing device according to claim 1, wherein the controller uses a predetermined time as the second time and schedules so as to execute one or more of the divided diagnostic tests in the third time.

3. The drawing processing device according to claim 1, wherein the controller uses an estimated time which is estimated from a drawing command to the GPU as the second time and schedules so as to postpone execution of the divided diagnostic tests in a case where the third time is less than a time requested for execution of the divided diagnostic tests.

4. The drawing processing device according to claim 3, wherein the controller schedules so as to prefer execution of the divided diagnostic tests and to postpone execution of the drawing processes for one frame in a case where execution of all the divided diagnostic tests in a fault-tolerant time interval cannot be completed when scheduling so as to complete execution of the drawing processes for one frame in the first time.

5. A diagnostic test method comprising:
dividing, into time segments, an execution of a diagnostic test of a Graphics Processing Unit (GPU) as divided diagnostic tests; and
scheduling so as to:
complete execution of drawing processes for one frame in a first time which is a one-frame display time which is defined in accordance with a frame rate, and
execute one or more of the divided diagnostic tests test in a third time which is a remaining time obtained by subtracting a second time, which is a processing time requested for execution of the drawing processes for the one frame, from the first time.

6. The diagnostic test method according to claim 5, further comprising:
using a predetermined time as the second time and scheduling so as to execute one or more of the divided diagnostic tests in the third time.

7. The diagnostic test method according to claim 5, further comprising:
using an estimated time which is estimated from a drawing command to the GPU as the second time and scheduling so as to postpone execution of the divided diagnostic tests in a case where the third time is less than a time requested for execution of the divided diagnostic tests.

8. The diagnostic test method according to claim 7, further comprising:
scheduling so as to prefer execution of the divided diagnostic tests and to postpone execution of the drawing processes for one frame in a case where execution of all the divided diagnostic tests in a fault-tolerant time interval cannot be completed when scheduling so as to complete execution of the drawing processes for one frame in the first time.

9. A non-transitory computer-readable medium storing instructions which cause a computer to:
divide, into time segments, an execution of a diagnostic test of a Graphics Processing Unit (GPU) as divided diagnostic tests; and
schedule so as to:
complete execution of drawing processes for one frame in a first time which is a one-frame display time which is defined in accordance with a frame rate, and
execute one or more of the divided diagnostic tests in a third time which is a remaining time obtained by subtracting a second time, which is a processing time requested for execution of the drawing processes for the one frame, from the first time.

10. The medium according to claim 9, further comprising instructions which cause the computer to:
use a predetermined time as the second time and schedule so as to execute one or more of the divided diagnostic tests in the third time.

11. The medium according to claim 9, further comprising instructions which cause the computer to:
use an estimated time which is estimated from a drawing command to the GPU as the second time and schedule so as to postpone execution of the divided diagnostic tests in a case where the third time is less than a time requested for execution of the divided diagnostic tests.

12. The medium according to claim 11, further comprising instructions which cause the computer to:
schedule so as to prefer execution of the divided diagnostic tests and to postpone execution of the drawing processes for one frame in a case where execution of all the divided diagnostic tests in a fault-tolerant time interval cannot be completed when scheduling so as to complete execution of the drawing processes for one frame in the first time.

* * * * *